United States Patent
Yamartino

(10) Patent No.: US 7,624,003 B2
(45) Date of Patent: Nov. 24, 2009

(54) SPLIT-PHASE CHAMBER MODELING FOR CHAMBER MATCHING AND FAULT DETECTION

(75) Inventor: John M. Yamartino, Palo Alto, CA (US)

(73) Assignee: Applied Materials, Inc., Santa Clara, CA (US)

( * ) Notice: Subject to any disclaimer, the term of this patent is extended or adjusted under 35 U.S.C. 154(b) by 799 days.

(21) Appl. No.: 11/033,363

(22) Filed: Jan. 10, 2005

(65) Prior Publication Data

US 2006/0155410 A1 Jul. 13, 2006

(51) Int. Cl.
*G06G 7/48* (2006.01)
(52) U.S. Cl. .......................................... 703/6; 700/108
(58) Field of Classification Search .................. 703/6, 703/14; 118/723 R, 725; 62/6; 700/108, 700/110
See application file for complete search history.

(56) References Cited

U.S. PATENT DOCUMENTS

| | | | |
|---|---|---|---|
| 5,711,843 A | | 1/1998 | Jahns |
| 5,775,109 A | * | 7/1998 | Eacobacci et al. ................ 62/6 |
| 6,192,287 B1 | | 2/2001 | Solomon et al. |
| 6,278,899 B1 | | 8/2001 | Piche et al. |
| 6,645,303 B2 | * | 11/2003 | Frankel et al. .............. 118/725 |
| 6,697,691 B1 | | 2/2004 | Miller et al. |
| 6,733,618 B2 | | 5/2004 | Kagoshima et al. |
| 6,781,383 B2 | | 8/2004 | O'Leary et al. |
| 6,825,920 B2 | | 11/2004 | Lam et al. |
| 6,863,019 B2 | * | 3/2005 | Shamouilian et al. ... 118/723 R |
| 2003/0052083 A1 | | 3/2003 | Kim et al. |
| 2004/0172153 A1 | | 9/2004 | Zhang et al. |

OTHER PUBLICATIONS

Tao et al., H.J. Impact of Etcher Chamber Design on Plasma Induced Device Damage for Advanced Oxide Etching, 1998 3rd Int. Symposium on Plasma Process-Induced Damage, Jun. 1998, pp. 60-63.*
Benson-Woodward et al., H. Process Control Methodology for PSG and PETEOS Films in a Highly Interactive Multiprocess CVD System, IEEE Advanced Semiconductor Manufacturing Conference and Workshop, Nov. 1995, pp. 216-222.*
Oka et al., S. Verification of Multi-Functional Vertical Furnace, IEEE Int. Symposium on Semiconductor Manufacturing, Sep.-Oct. 2003, pp. 400-403.*

* cited by examiner

*Primary Examiner*—Russell Frejd
(74) *Attorney, Agent, or Firm*—Christopher R. Balzan

(57) ABSTRACT

In at least one embodiment, the present invention is a method for thin-film process chamber data analysis, which includes acquiring chamber data, defining an adjustment portion of the chamber data and a steady-state portion of the chamber data, and forming a chamber model having an adjustment portion and a steady-state portion. The method can further include comparing the chamber model with a subject chamber to provide a chamber data comparison and utilizing the chamber data comparison.

34 Claims, 7 Drawing Sheets

SPLIT-PHASE CHAMBER MODELING FOR CHAMBER MATCHING AND FAULT DETECTION

BACKGROUND

In semiconductor manufacturing, the production processing equipment used must be controlled such that its variables stay within certain operational limits. These limits can be very narrow and typically vary throughout the different steps, stages or phases of the process. Failure to remain within these operational limits during processing can easily cause the loss of, or damage to, the device and/or wafer being processed.

Achieving proper operation of the production equipment typically involves both the initial set-up or configuration of the equipment prior to processing, and the monitoring and control of the equipment during processing. For process chambers, the initial set-up can include chamber matching, which is a method where the performance of the chamber being set up is compared to a data from a set of known good chambers. For monitoring and controlling a process chamber a method of fault detection is typically used. With chamber fault detection, data are monitored and analyzed to identify behavioral deviations from known good (normal) operation of the chamber.

One previous method of chamber matching has been to acquire performance data from the chambers in question and compare to some performance specification. While historically the primarily approach to acquiring data for chamber matching has been to use on-wafer performance (i.e. etch rates, uniformity etc), more recently, due to the large amounts of data provided by newer systems, the approach has been to detect chamber differences without checking on-wafer performance. Eliminating the need for checking on-wafer performance saves both time and costs.

After the process equipment performance has been confirmed (and corrected) by chamber matching, the chamber can be operated using methods to monitor and control the process. Such methods include fault detection where data are monitored from a process tool and analyzed for behavioral deviations. One of the simplest approaches has been to use statistical process control, or SPC, where certain quantities are monitored against upper and lower control limits. Such control limits can range from simple fixed values to those with complex definitions. If a quantity exceeds a certain limit, then the chamber is 'faulted' and the processing is halted. This approach ensures that wafers are not mis-processed, and as such, reduces scrap loss, and immediately informs the chamber operators of the problem. In the case of recipe execution for wafer processing, the SPC approach is limited since the processing chamber operates in a series of different regions of its operational space while processing a wafer. The dynamics of the recipe execution (and behavior) is difficult to track with simple SPC methodologies.

Therefore, a need exists for a method, or methods, to provide more accurate way of chamber matching and fault detection.

SUMMARY

In at least one embodiment, the present invention is a method for thin-film process chamber analysis, which includes acquiring chamber data, defining an adjustment portion of the chamber data and a steady-state portion of the chamber data, and forming a chamber model having an adjustment portion and a steady-state portion. The method can further include comparing the chamber model with a subject chamber to provide a chamber data comparison and utilizing the chamber data comparison.

Depending on the embodiment, the data acquired to form the chamber model can come from more than one chamber and/or from more than one run of a chamber. The data acquired can be obtained from measuring chamber variables over time. The measured chamber variables can include chamber temperatures, chamber pressures, gas flow rates, bias RF power, source RF power, microwave power, voltage readings, current readings, and/or pressure control valve positions, and the like.

The chamber data can be divided in different ways depending on the embodiment. The adjustment portion of the chamber data can include chamber data acquired during a transition between at least two operational conditions of the chamber. The steady-state portion of the chamber data can include chamber data acquired when a chamber is operating in accordance to at least one predefined operational condition.

In certain embodiments, forming the chamber model can include performing a multivariate analysis on the adjustment portion and the steady-state portion of the chamber data. The multivariate analysis can involve forming a linear combination of the chamber variables and individually weighting each of the chamber variables.

For some embodiments, the step of comparing the chamber model with a subject chamber is performed with either the subject chamber online or offline. The step of utilizing the chamber data comparison can include adjusting the subject chamber, issuing a warning and/or faulting the subject chamber. Faulting the subject chamber typically involves ceasing operation of the chamber.

In other embodiments, the method is a split-phase chamber analysis method which includes executing a process run having at least one phase of operation, measuring at least one chamber variable during the at least one phase of operation to form chamber data, separating the chamber data into at least one adjustment portion and at least one steady-state portion for each of the at least one phase of operation, and performing a multivariate analysis on the at least one adjustment portion and the at least one steady-state portion of the chamber data.

In additional embodiments, the present invention is a thin-film chamber analysis method for chamber matching, which includes acquiring chamber model data from more than one known chamber, defining transition and steady-state portions of one or more process phases of the chamber model data, performing a multivariate analysis to form a chamber model with transition and steady-state portions, comparing the chamber model with a subject chamber during an offline analysis, and adjusting the subject chamber to correct any deviations.

In still other embodiments, the present invention is a thin-film chamber analysis method for fault detection, which includes acquiring chamber model data from more than one run of a chamber, defining transition and steady-state portions of one or more process phases of the chamber model data, performing a multivariate analysis to form a chamber model with transition and steady-state portions, comparing the chamber model with a subject process run of the chamber during an online analysis, halting operation of the chamber if the comparison of the run to the model reveals deviation beyond the allowed limit.

DETAILED DESCRIPTION

Figure 1A:
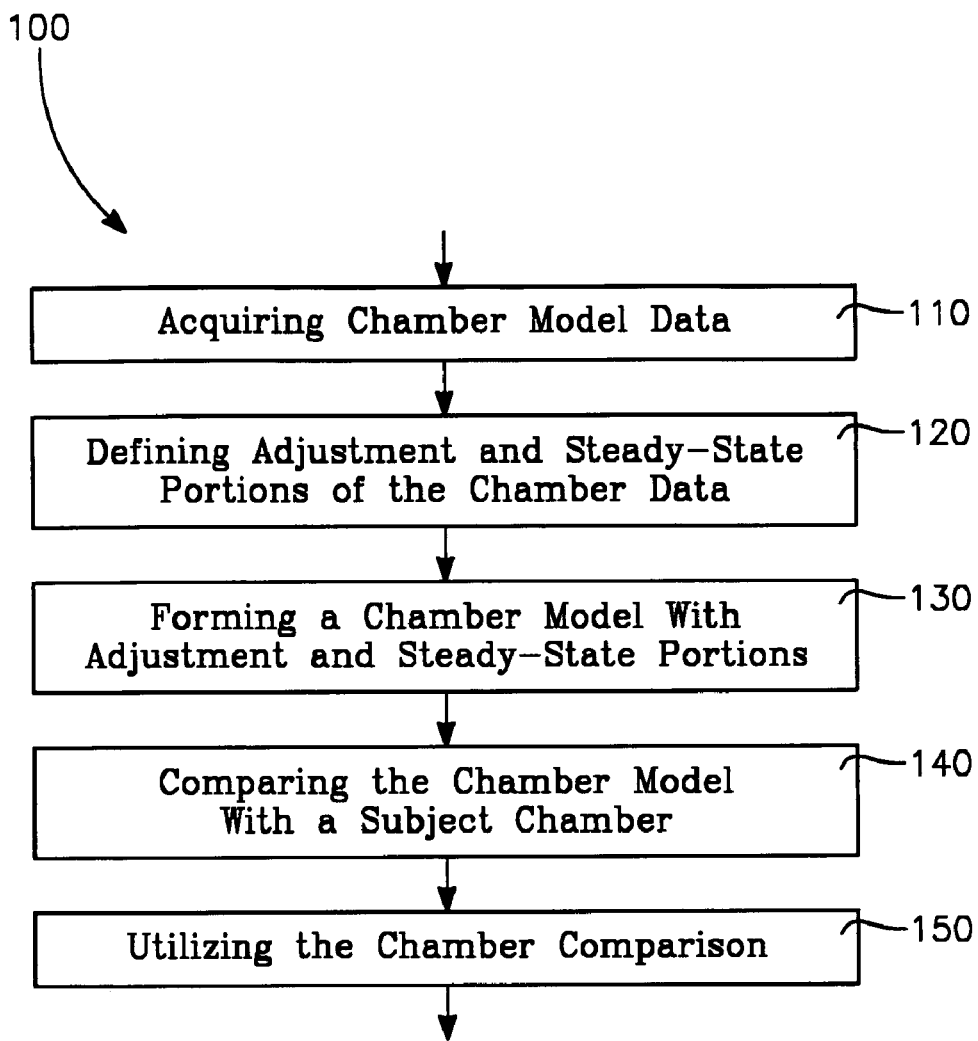
FIG. 1A is a flow chart of a method in accordance with at least one embodiment of the present invention.

Embodiments of the present invention include models and modeling methods which divide the process steps or phases to account for different regions or portions of data that are characterized by certain dynamics. Examples of these data portions can include transition periods, steady-state periods, endpoint periods, and the like. Division of the phases allows for improved accuracy of the resulting model by reducing or eliminating any adverse effect which may be otherwise caused by one of the data portions upon the other data portion(s). In this manner, embodiments of the present invention allow for the formation of models using select portions of data which allow for a more representative model of the operation of the tool. Depending on the embodiment the present invention can be used with chambers such as thin-film process chambers, semiconductor process chambers, and the like.

In at least one embodiment of the present invention, each phase of the process contains an adjustment portion and a steady-state portion. The adjustment portion can be a transition, transient or stabilization period containing the change between the steady-state portion of the particular phase and the steady-state portion of either a previous phase or a later phase. Since each phase of the process can be performed under a variety of different conditions, the transition can include significant changes in the operational conditions of the chamber. In such embodiments, the steady-state portion can be during a period of equilibrium or substantial equilibrium in the chamber.

By forming a model of the entire phase, the resulting model is created a combination of data of both the adjustment and steady-state portions of the process phase. The inclusion of the transition data can dilute or reduce the sensitivity of the model to the steady-state data variations. That is, by using data from across the entire process phase, the resulting model will have less sensitivity to variations then if the data are considered separately for transition and steady-state. However, embodiments of the present invention, by forming sub-step models, can provide models of chambers that are more sensitive to behavioral deviations than the prior whole-step modeling approaches.

The sub-step modeling can be performed from a single or multiple adjustment and steady-state portions of the process phase or phases, depending on the particular embodiment. While often the phase is just divided into a single adjustment and a single steady-state portion, for phases that have more than two operational characteristics, a third or more division can be made in the phase. For example, an additional split could be used in a phase where an ignition operation occurs not only and at the beginning of the phase, but also during the phase. Such an additional ignition operation can be treated separately from the adjustment portion of the process phase. Likewise, in another example, at the end of some steps, the clearing of films can create another transition, which can be more accurately represented if it is separately modeled.

Depending on the embodiment, a recipe is a set of steps or phases that are run sequentially over time. A phase of a recipe is a set of operational conditions that the chamber runs under recipe control. The transitions occur when the chamber ends one phase and changes the operational setpoints to those defined in the next phase of operation. In some cases, the setpoints make step function like changes from one phase to the next. In other cases the changes are more sophisticated, such that the transition is controlled to at least a certain degree. This controlled transition provides a reduction to the swings from one set of setpoints to the next, and/or provides protection to the chamber. Also, a controlled transition at the end of a phase can be employed to better control the process and chamber. Endpoint transitions, which can be due to etching through a film, are not controlled but do result in a response in the chamber that can also be a transition. In some cases endpoint responses are exploited for endpoint control.

The present invention can provide a variety of different split-phase models including those for chamber matching and/or monitoring (i.e. fault detection).

For chamber matching, one way to characterize the performance of a given chamber includes using data from the chamber to create a statistical multivariate model of the chamber. By recording all the chamber variables during processing (i.e. during a recipe run), a chamber model, or fingerprint, can be created using a single run, or several runs, from a sampling, or multiplicity, of known good chambers. Good chambers are those that are known to consistently operate within desired parameters and provide acceptable process results. The use of a set of known good chambers is critical to capturing the normal statistical variations which inherently exist between different chambers.

Such chamber models are time dependent characterization of the chamber behavior. Since a recipe is executed in discrete steps, a separate model can be created for each recipe step and the full model can be formed from a sequence of the step models.

In a manner similar to that of chamber matching, a chamber model can be developed and used for fault detection methods. A chamber model improves the ability to track the behavior of the chamber over a period of time. This is achieved by creating a model of the processing chamber that captures the full dynamics of the processing chamber as it executes the recipes. All, or in some cases most of, the dynamic system variables can be utilized in order to be sensitive to deviations as a result of any possible problems.

A model for fault detection can be created from a sampling (multiplicity) of known good wafer processing runs to capture the normal statistical variations of run to run processing. Since the recipe is executed in discrete steps, a separate model can be created for each recipe step and the full model can be formed from the sequence of models of the steps.

While using modeling of process steps for chamber matching and fault detection provides certain benefits, such modeling can have certain limitations in its accuracy when both the transition data and the steady-state data are used together in a step of the model. Since the transition data can be significantly different from the steady-state data, such a resultant model of the entire step will be offset from that of the steady-state by the effect of the transition data, which reduces the accuracy of the model. A more accurate model is more sensitive to operational deviations. Embodiments of the present invention separate the transition and the steady-state portions to improve the accuracy of the model.

Chamber matching has gained increased importance as the complexity of process chambers has increased. Due to this increased complexity, the ability to manufacture and install such chambers with uniform quality and configuration, has become increasingly difficult. Chamber control, which can be defined by many equipment constants or EC's, influences the process in subtle and often unseen ways. In addition, chamber component variations which were too small to detect with prior operational tests and which lay outside of the 'normal' distribution of behavior need to be identified. In order to reveal the workings of chamber operation, chamber trace data need to be scrutinized and analyzed for consistent chamber-to-chamber behavior.

In some embodiments, chamber matching, or comparison, is a modeling methodology (also known as fingerprinting) by which a chamber can be configured for matching to one or more other chambers. Such other chambers can have certain known and/or desire quantities which are sought to be replicated or otherwise reproduced in the chamber being matched. Such modeling methodology is sometimes referred to as a 'golden' chamber model. Chamber matching models can provide a useful tool to increase first pass yield as well as improve the overall quality of the subject chamber.

Chamber matching is typically employed when the subject chamber is first manufactured, during the chamber's startup, or at any time the overall performance of the chamber is in question or at issue. Data from one or more process runs of the subject chamber can be compared to the chamber model for setting or configuring the subject chamber. This facilitates the subject chamber beginning operations at a given arrangement or set of conditions without significant adjustment or tweaking by the user.

Depending on the embodiment, chamber matching can be an offline analysis which is performed prior to operation of the subject chamber in either a manual and/or and automated process. With automated chamber matching embodiments, the same or similar infrastructure, equipment and/or processes used to create chamber monitoring or fault detection models, can be used. Also, automated chamber matching can allow for a '1-click' action of an operator to match, or compare, the subject chamber to the model.

Increased accuracy in chamber matching can be achieved with the present invention by separately modeling the adjustment and the steady-state portions of each phase from a process runs from a set of know (i.e. good) chambers. Likewise, more precise chamber monitoring or fault detection can be obtained with the present invention by separately modeling the adjustment and the steady-state portions of each phase from a set of separate runs of a given chamber.

Chamber monitoring or fault detection can provide a run-by-run determination of the health of a chamber as it is in production. Available chamber data are used to construct an index or model that can discriminate between normal run-to-run variations and excursions due to poor performance. Prior approaches to determining errors or fault during processing have shown that the ability of typical chamber control software to determine the health of a chamber is very limited. For example, a chamber controller can monitor a controlled value and compare it to the setpoint from the recipe. However, there is a whole class of chamber variables that are not controlled but do provide useful information regarding the performance of the equipment. In addition, the control limits placed within the recipe control are limited to the stable operational times of the recipe step making it very difficult to identify excursions during the transient portion of the recipe step. Also, the chamber controller itself, having a high level of software control is subject to software bugs or misconfigurations that can introduce unwanted chamber behavior changes or instabilities.

Chamber monitoring and fault detection are modeling methodologies which allow for detection of deviations or faults occurring during a given process run of a given chamber. Fault detection models can be based on prior process runs of the chamber defining acceptable, allowable or otherwise preferred parameters, trends or the like, for various conditions in the chamber. That is, depending on the embodiment, a fault in a process run can be determined when a given condition, or conditions, no longer conform to the model of the chamber.

In many embodiments fault detection is an automated process used to monitor the process during a run. In other embodiments fault detection is a manual process.

With split-phase modeling of the present invention, the fault detection model can include separate sub-models which are derived from the adjustment and steady-state portions of the process phase. This provides more accurate model than those achievable by prior whole-step modeling approaches.

In some embodiments, the present invention is a method for chamber modeling 100 which includes acquiring chamber model data 110, defining adjustment and steady-state portions of the chamber data 120, forming a chamber model with adjustment and steady-state portions 130, comparing the chamber model with a subject chamber 140, and utilizing the chamber comparison 150. These steps are set forth in Figure or FIG. 1A.

As described in detail herein, the method 100 can, in various embodiments, include additional steps as well as a variety of different sub-steps for each of these steps. Also, the present invention can include other method embodiments than that set forth in the method 100.

As set forth herein, the method 100 can include embodiments for chamber matching and fault detection. Among other things, the chamber matching and fault detection embodiments of the method 100 vary by the manner which the chamber model data are acquired and the manner which the subject chamber may be adjusted after comparison with the chamber model. In some embodiments, chamber matching includes acquiring data from more than one chamber and the adjustment (if any) of the subject chamber is performed prior to production operation of the chamber. In contrast, for certain fault detection embodiments, the model data are collected from more than one run of the subject chamber, or interdiction (warning or taking the chamber out of operation) can be made during the running of the chamber.

Acquiring Chamber Model Data:

Depending on the embodiment, during the step of acquiring chamber model data 110 data relevant to the operation of the chamber, or chambers, can be acquired for later formation of a chamber model.

The data acquisition can include the measurement of various variables during the operation of a single chamber or several chambers over one or more process runs. The particular variables that are measured are dependent on the specific embodiment of the invention, specifically the chamber, or chambers, used and the data which are available to be measured from these chamber(s) Generally, the data acquired typically includes chamber temperatures, pressures, gas flow rates, bias RF power, source RF power, microwave power, voltage and current readings, pressure control valve positions, and the like. More specifically, measurable variables can include pressure readings, pressure control valve position, total and individual gas flows, RF measurements of voltage, current and phase (and quantities, such as DC bias, derived from these measurements), forward and reflected RF powers, RF match tuning positions, microwave forward and reflected powers and tuning positions, electrostatic chuck voltages and currents, Helium cooling pressures, flows and leak rates, magnet currents and chamber component temperatures. For example, with a DPS II chamber, which is manufactured by Applied Materials, Inc. San Jose, Calif., U.S.A., the measurable variables can include pressure, total flow, Z-Scan I, Z-Scan V, Z-Scan Phi, ESC I, ESC V, divcap, divcap i1, divcap i2, divcap ratio, src shunt, src forward, src series, src refl, bias series, bias shunt, bias forward, bias refl, He1 pressure, He1 flow, He1 leak, He2 pressure, He2 flow, He2 leak, gas12 flow, Throttle Gate Valve (TGV), pctopen, Vpp, HX2 temp. Of course any of a variety of other chamber variables not specifically set forth could also be used.

The variables that are measured for chamber modeling can be a controlled variable, such as the chamber pressure, which is defined in the process recipe, or not controlled, such as the pressure control valve, which has no set point in the recipe but instead sets itself as needed based on the flow and required pressure.

During data acquisition the data can be recorded or stored by any of a variety of well known methods. In some embodiments, the data are stored digitally on a computer to allow for later configuration and use of the data as done in later steps of the method 100. Also, the sampling rate of the data acquisition can vary depending on the embodiment of the method 100, the variable measured, the rate of change of the variable, and the like. For example, in certain embodiments, the chamber data are acquired at a frequency of 10 Hz.

Figure 1B:
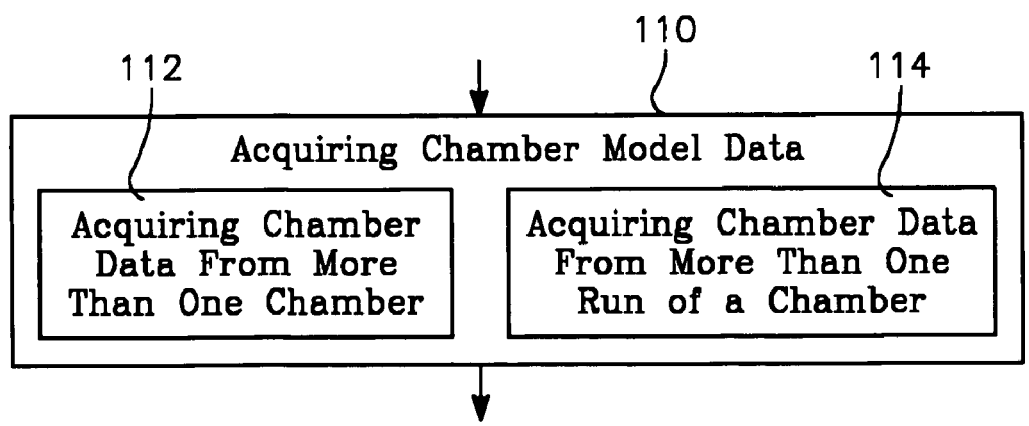
FIG. 1B is a flow chart of a step of a method in accordance with at least one embodiment of the present invention.

The step of acquiring chamber model data 110 can have of any of a variety of different embodiments. For instance, as shown in FIG. 1B, the method 100 can include sub-steps of acquiring chamber data from more than one chamber 112 and acquiring chamber data from more than one run of a chamber 114. Additional sub-steps for acquiring chamber data can also be included in the method 100 depending on the particular embodiment.

The step of acquiring data from more than one chamber 112 can provide a means of collecting data for chamber matching embodiments of the method 100. In certain embodiments, during the step 112, data are collected from a set of chambers which are known to have certain acceptable behaviors and/or quality of operation. These known good chambers can be run with a common process or recipe and the data are recorded for later model creation. The data acquired from a group of chambers, even those considered good chambers, typically will include a certain amount variation from chamber to chamber. That is, chambers are not normally identical in operation and can vary while each still having acceptable operational behavior.

In some embodiments, the recipe used for acquiring data from each chamber can be a recipe that is run in manufacturing and which is developed and tested for each chamber type. Such a recipe can be one which is specifically designed for efficacy and safety and which is tested for stability prior to use.

For example, using any one of a DPS II chamber, HART chamber, eMAX chamber, Enabler chamber, Producer Etch chamber, which are manufactured by Applied Materials, Inc. San Jose, Calif., U.S.A., chamber data can be collected in the final test portion of manufacturing and the startup portion of installation at the end user site using a data acquisition system or with Applied Materials manufactured chambers a Fast Data Acquisition or FDA system. A collection plan, (i.e. a list of chamber variables), is developed for each chamber type to insure that the full set of available variables is recorded for each chamber run. In final test portion of manufacturing, data are collected from each chamber by running the prescribed recipe. The data files are then uploaded to a database where they are available for analysis. One example of a usable database is Lotus Notes which is produced by IBM Corporation of White Plains, N.Y., U.S.A.

The step of acquiring data from more than one run of a chamber 114 can provide a means for collecting data for fault detection embodiments of the method 100. In certain embodiments, during the step 114, data are collected from a set of runs which can use a common recipe in the particular subject chamber. The data acquired from a group of runs of the same chamber, typically will include a certain amount variation from run-to-run, even when executing identical recipes. That is, data from different runs with the same chamber and recipe are not normally identical and the data can vary even though the results from each of the runs are still within acceptable operational behavior. For any given variable, the run-to-run variations are typically significantly smaller than the variations from runs in different chambers.

Defining Adjustment and Steady-State Portions:

Another step in the method 100 is defining adjustment and steady-state portions of the chamber data 120. During this step the data acquired in step 110 is configured or arranged prior to later steps where the chamber model is formed. This step allows for modeling of specific separate sections of data for increased accuracy in the resulting models. In some embodiments, the data are defined as adjustment (transition or stabilization) portions and steady-state portions of a phase of the recipe.

The adjustment or transition portion of the data can be during a period of time between set conditions of two separate process phases. That is, after completion of a phase of the processing one or more of the conditions of the chamber can change to new values, this period of change is the transition portion of the process phase. Examples of changing conditions can include increasing the pressure of the chamber, introducing a new gas at a particular flow rate, further closing a valve, or the like. In some embodiments, the transition portion is a period of time where the chamber is adjusting its controllable parameters, such that the chamber components that are actuatable, are making an adjustment to maintain one or more setpoints (e.g. the pressure control valve and the RF match position). The transition portion of the process phase can occur at any point during the phase, at the beginning, end or therebetween. Also, a process phase can contain more than one transition portion.

The dynamics of the transition portion of the phase can be very different from the dynamics of the steady-state portion. And the process of separating the chamber data allows for isolation of the transition dynamic from the steady-state dynamic.

Depending on the embodiment, the duration of the transition portion can vary, with the particular duration being determined by factors including the conditions being changed, the extent of the change, the rate of change, the capabilities of the chamber, etc. In some examples the transition period is between 5 and 20 seconds in duration. In some embodiments, phases with transition periods less than 5 seconds in duration do not have the transition and steady-state portions separated, as the affect of one portion on the other is not very great. Typically, the transition portion of the phase is significantly shorter in duration than the steady-state portion.

Since one or more conditions within the chamber are in flux during the transition period, separating the transition portion from the steady-state portion allows a more accurate model of the chamber to be created. That is, the separation of the transition portion from the steady-state portion increases the sensitivity of the steady-state model to deviations in the run relative to the model.

In this manner, the model of the process phase can separately represent the transition and the steady-state portions. That is, with the present invention the process phase is not represented as just a single model of the phase, as done in prior approaches, where the steady-state region of the model was adversely biased towards the transition data. Such single modeling of the entire process phase effectively ignored, or was otherwise not sufficiently sensitive to small changes occurring during the steady-state. Further, because of the transition data skewed the steady-state portion of the model, the loss of sensitivity for the steady-state was even greater after relatively large transitions.

The steady-state portion of the process phase represents the section of the phase where the conditions of the chamber conform, substantially conform, or in some embodiments, generally conform to the conditions desired for the phase. That is, during the steady-state portion, the chamber is operating at, or about, the conditions that are defined in the process recipe. While the specific conditions are dependent on the recipe, certain conditions or set points are held constant during the steady-state portion of the phase, while other conditions change over the course of the phase in response to the processing occurring. This response can be due to a drift in the chamber environment caused by factors such as a wafer film being etched, increase chamber temperature, or the like.

The steady-state portion can be a non-transitory period where the conditions of the chamber remain constant, substantially constant, or to the extent that the conditions change, the change is relatively slow (relative to the rate of the changes during the transition portion). The steady-state portion can be during a period of equilibrium in the chamber where the forces tend to balance such that the operation of the chamber remains relatively constant.

The steady-state portion can begin at the end of the preceding transition portion and the steady-state portion can end at the end of the phase, which coincides with the start of the transition portion of the next phase. As such, while the start of the steady-state portion is dependent on the completion (i.e. the response) of the transition, the end of the steady-state portion can be dependent on a condition, or conditions, as set forth in the process recipe. These recipe conditions can include a given time for processing, or in some cases, from a responding variable such as a process endpoint determination.

In certain embodiments of the present invention, the process phase can have more than one steady-state portion. This can occur when the phase has more than one transition portion. Also, it should be noted that the steady-state portion of the process phase can occur at the start, end, or middle of the phase. For example, a process phase can be divided into a starting transition, a steady state and a finishing transition, which can be either due to an endpoint transition or due to deliberate recipe control. Also, the phase could be divided into any number of portions of any length, with the first and last portions always starting and stopping at the beginning and the end, respectfully, of a recipe phase. A similar example has any number of divisions of any length which are independent of the beginning or end of the recipe phases. Still other examples include where the entire recipe is divided into a large and equal number of time portions with each division large enough to provide enough data in each portion for modeling needs and independent of where the phase divisions occur.

Figure 2:
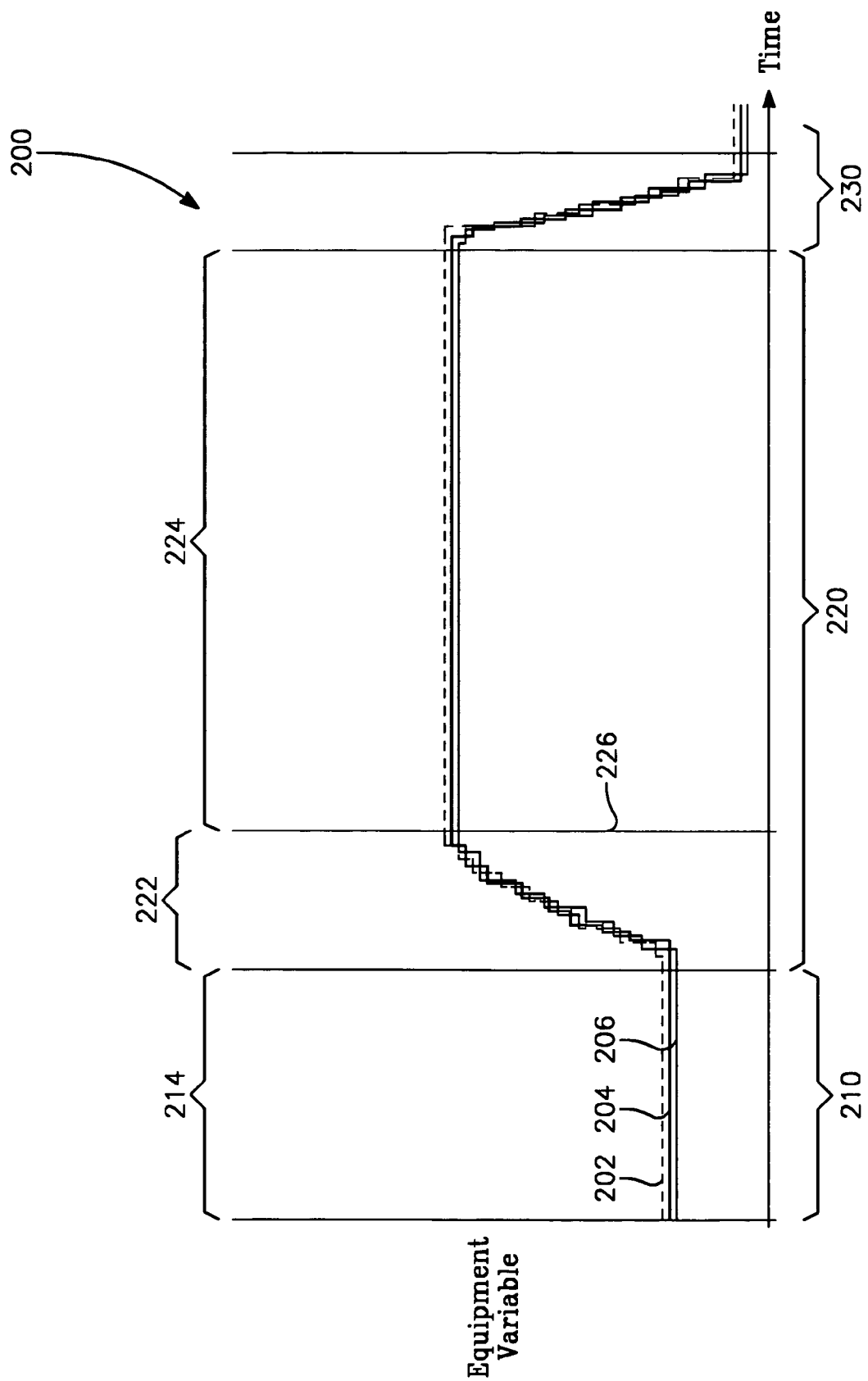
FIG. 2 is a graph of a process condition in accordance at least one embodiment of the present invention.

Shown in FIG. 2, is an example of transition and steady state portions of a process phase for a particular process recipe. As shown, the graph 200 is of a equipment or chamber variable versus time (for example a source shunt position variable verses time is shown) for several different runs. The data from each process run is represented by the separate traces 202, 204, 206, which indicate the varying of the equipment variable over time. Depending on the embodiment, these tacks can be from different runs in different chambers (e.g. for chamber matching), or for different runs in the subject chamber (e.g. for fault detection). The graph 200 includes a portion of a first process phase 210, a second process phase 220 and a portion of a third process phase 230. As shown, the equipment variable is held relatively constant value during the first phase 210 and then moves to a second relatively constant value for the later portion of the second phase 220. Between these two regions where the equipment variable is kept relatively constant for each run is an area of transition for the equipment variable. After the first phase 210 and at the beginning of a second process phase 220 is a transition or stabilization portion 222. The transition portion 222 reflects the transition of a condition from a first steady-state portion 214 of the first phase 210 and a second steady-state portion 224 of the second phase 220. The steady-state portion 224 reflects the chamber reaching and maintaining the desired conditions for the particular process phase of the recipe.

Defining the separation between the transition and steady-state portions of a process phase can be performed by any of a variety of different methods. These methods can be manual, with the user defining the separation, automated, where software or other device is used, or a combination of both can be used.

In a manual approach the user reviews the acquired data the based on his or her judgment determines the separation between the portions. One manual method is for each phase to plot each measured variable or process condition as a function of time and determine when the last of the variables reaches, or substantially reaches, its commanded or expected initial value as set forth in the process recipe. This defines a common time that for the separation between the transition and steady state for all the variables.

For example, for determining the separation between data portions for one equipment variable, a user could employ a graph such as the graph 200 in FIG. 2. The separation between the transition portion 222 and the steady-state portion 224 could be made by a user at the time as shown by the line 226. That is, a separation time could be determined for the equipment variable at a time just after the equipment variable reaches the value for that as designated by the process recipe. Then, with other similar graphs which plot the other measured equipment variable s as a function of time, the user can determine separation times for each condition. The latest of these separation times for all the measured condition being the separation between the transition portion and the steady-state portion of that phase of the process. This process being repeated for each of the phases to be split for modeling.

The operation of separating the data portions can also be automated. A program could be used to analyze each of the measured variables and determines at what time the last variable reaches its reaches its commanded or expected initial value per the recipe. Also, such an approach allows the separation to be determined when an variable comes with a certain range of its recipe value. Of course, many other methods for determining the separation between the transition and the steady-state portions of the phase can be used such as trend analysis, slope calculations, or the like.

The step of defining adjustment and steady-state portions 120 can also include editing the acquired chamber data. This can include reviewing and removing improper or otherwise corrupted data and arranged the data to meet the formatting requirements of specific modeling software.

Forming a Chamber Model:

Another step in the method 100 is forming a chamber model with adjustment and steady-state portions 130. Depending on the embodiment, the chamber model is a time dependent characterization of the chamber behavior during the execution of a recipe or recipes. The chamber model is formed by utilizing the acquired data with one or more modeling equations. In some embodiments, all, or a majority, of the dynamic system variables are utilized so that the model may be sensitive to various deviations or other problems with the setting or operation of a chamber. The modeling equations function to weigh the system variables to represent the operation of the modeled chamber or chambers.

Selection of the data provided for creating the model can determine the application of particular model. For example, with chamber matching embodiments, the model can be created utilizing data acquired from more than one known (i.e. good) chamber which can be executing a common recipe, such that the model includes the statistical variation existing between these chambers. For fault detection embodiments, the model can be formed from data acquired from more than one run, which can be of a common recipe, in the subject chamber, such that the statistical variations from run to run are captured.

Since the process recipe is typically executed in discrete steps or phases, the chamber model can be made of separate models for each of the phases of the recipe. In this manner the full model of the process is the sequence of models from each phase.

The model can be formed in a variety of methods including, in at least one embodiment of the invention, the model is formed by a multivariate analysis or MVA. A multivariate analysis operates to calculate a behavioral index that varies with time. That is, the MVA creates a principal component, or components, value or scores, which are a linear combination of all the measured chamber variables, with the variables being individually weighted. The score embodies the variable dynamics of the chamber operation including the statistical variations. The score can be represented by the following equation (1):

$$\text{Score} = AV_1 + BV_2 + CV_3 + DV_4 + \ldots \quad (1)$$

Where A, B, C, D . . . , are the weighted values or coefficients for each of the respective variables $V_1, V_2, V_3, V_4, \ldots$ which are acquired from the modeled chamber for a particular period(s) of time (e.g. phase, transition portion, steady-state portion, etc.). As described herein, the acquired variables can include chamber conditions such as temperature, pressure, gas flow, source power, bias power, valve settings, and the like.

The degree of weighting for each variable is determined by its dynamic behavior and to provide sensitivity to behavior deviations. Each weighted value is determined for the entire period of the particular phase, so that each weighted value is constant over the phase. Each phase can have a different set of weights. In this manner the dynamics of each phase of the recipe is captured in a different way through the assignment of different variable weights. Another way of forming the score can be achieved by using a different function form of equation (1), with the model being characterized by a set of weights or components that are constant for a given period time that determines the model for that phase. The model also contains information about the statistical variations such that the deviations are detectable.

With the variables used as input to the MVA, being functions of time, the score is a function of time as well. A sample of a graph of a score as a function of time is set forth in FIG. 3.

Since the conditions of the chamber change for each phase of the recipe, the multivariate analysis is typically performed separately on each phase of the recipe. As noted for the present invention, the phases are further divided into at least one transition or stabilization portion and at least one steady-state portion and the multivariate analysis is performed on each of these portions separately. As a result, separate models for each portion of each recipe phase are provided.

Since the transition and the steady-state portions of the phase can contain very different dynamic behaviors, they have separate MVA's to avoid one portion, often the transition portion, from dominating the weight assignment of the other portion of the phase. In some embodiments when the transition portion is relatively short in duration, the phase is not separated as its influence, if any, on the steady-state portion is relatively low. In some embodiments the transition periods less than 5 seconds in duration are not separately modeled.

The MVA can be formed by manually by a user performing hand calculation on the data or by preparing a computer program to perform the calculations. Alternatively, a pre-existing and/or commercially available program can be used, such as multivariate analysis software.

Examples of such multivariate data analysis software packages include the modeling applications SIMCA-P, SIMCA-P+, and SIMCA-QP+ which are produced by Umetrics of Kinnelon, N.J., U.S.A. and of Umea, Sweden. SIMCA-P+ provides a means by which the acquired data can be analyzed to determine if the chamber variables are falling in a predictable distribution or if there is an indication of outlying behavior. Trace data are analyzed via partial least squares analysis of the chamber variables. This software application has been employed for various modeling use within the semiconductor industry. Other similar commercially available multivariate data analysis software can be used as well for creating the model. In certain embodiments, a neural network is used to perform the MVA.

With SIMCA-P+ a summary or overview can be obtained, this analysis is often call principal component analysis or factor analysis. SIMCA-P+ calculates a behavioral index that varies with time. That is, SIMCA-P+ creates a principal component value or score, which is a linear combination of all the measured chamber variables, with the variables being weighted by the software. The score is calculated with an equation similar to equation (1) set forth above. With the SIMCA-P+ software the weighting is determined using an internal algorithm.

Figure 3:
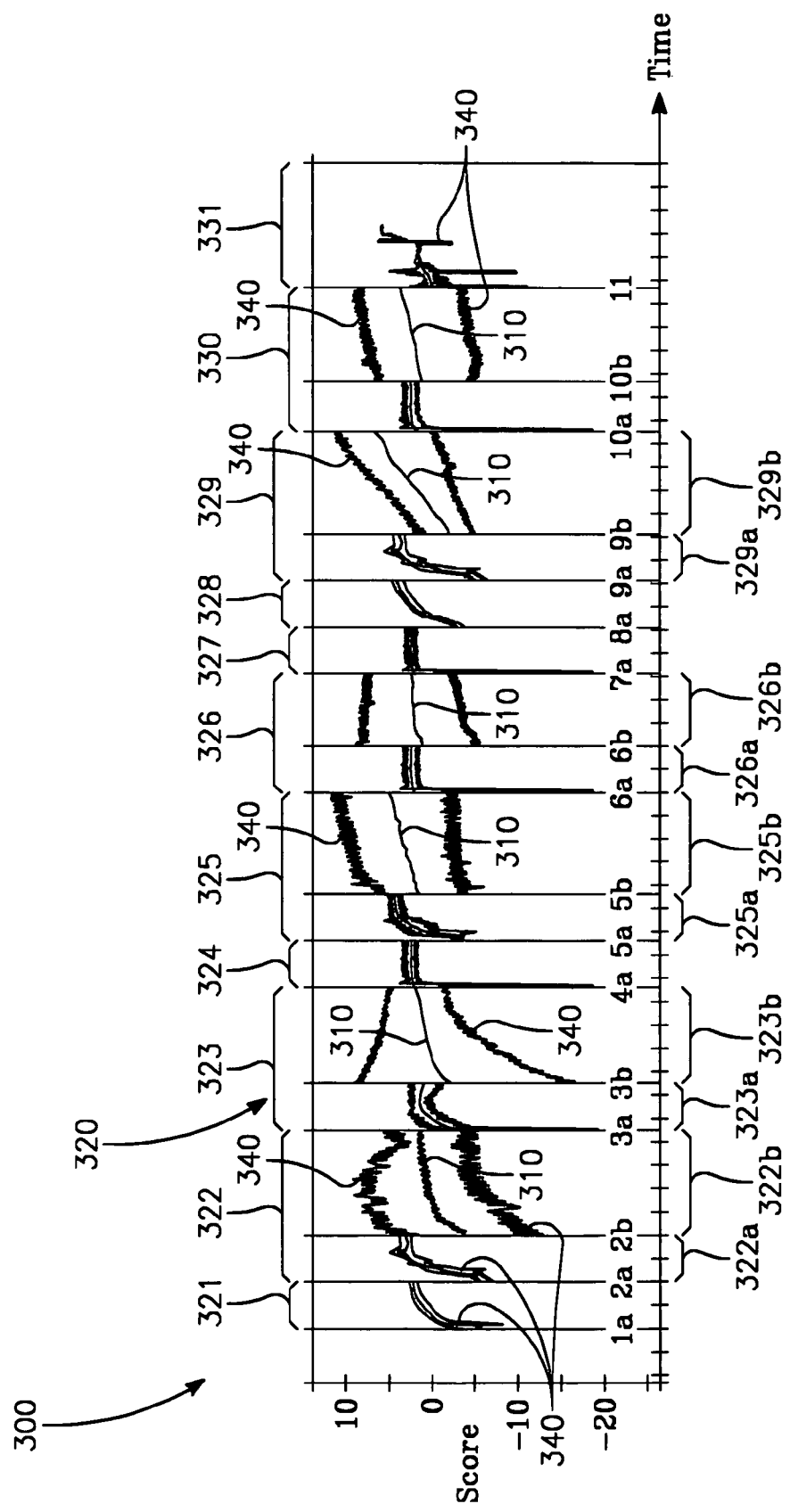
FIG. 3 is a graph of a model in accordance with at least one embodiment of the present invention.

A sample of a graph of a score or principal component value as a function of time is set forth in FIG. 3 (a sample of a run-to-run model being shown). As can be seen, the graph 300 has the score 310 from the MVA graphed over time. The time is over the process recipe and is separated into the phases or steps 320 of the recipe. The phases include the first phase 321, the second phase 322, third phase 323, a fourth phase 324, a fifth phase 325, a sixth phase 326, a seventh phase 327, an eight phase 328, a ninth phase 329, a tenth phase 330, a eleventh phase 331, and so forth. Certain phases 320 are further separated into the transition or stabilization portions and steady-state portions. For instance, the second phase 322 includes a transition period 322a and a steady-state portion 322b. Likewise, the third phase 323 includes a transition period 323a and a steady-state portion 323b, the fifth phase 325 includes a transition period 325a and a steady-state portion 325b, and so forth. It should be noted that some of the phases, such the first phase 321 are not separated into transition and steady-state portion. While these not separated phases have transition and steady-state portions, the lack of separation can be due to the relative short duration of the transition, which may not have a significant influence on the steady-state portion to warrant splitting the phase.

With the model created by a MVA using data for a more than one source (e.g. runs of several different chamber or different runs from a single chamber), the model will include a statistical variation. This statistical variation allows a determination to be made as to how significant any differences from the model are. This statistical variation is represented in the example of FIG. 3 as curves 340 positioned above and below the score curve 310. The curves 340 can be standard deviations, for example ±3σ. As such the curves 340 can effectively represent an envelope or range of operation of a chamber relative to the model.

In some embodiments of the present invention, the chamber model is created by a user in an offline process. That is, the creation of the model is not incorporated into the operation of the chamber (i.e. into the wafer processing). However, once the model is formed, it can be employed in either an online or an offline process as is detailed in the step of comparing the chamber model 140 of the method 100.

Comparing the Chamber Model:

The method 100 also includes the step of comparing the chamber model with a subject chamber 140. During this step the results of the chamber model are compared to data from run(s) of the subject chamber to form a chamber data comparison. This comparison allows for later adjustment of the chamber, issuance of operational warnings, and/or faulting of the chamber, as described further in the step 150 below. The comparison can include overlying the score trace (e.g. a plot of score as a function of time) for a run of the subject chamber over the score trace of the chamber model for comparison. Such comparisons allow the user to determine if, and to what extent, the subject chamber may have an problem with its settings and/or operation, and what adjustment or action may be needed. The chamber data comparison can be for multiple chamber analysis or for multiple run analysis.

In at least one embodiment, the subject chamber is compared to the chamber model by using a multivariate analysis applied to data acquired from the subject chamber to provide a subject chamber score as a function of time. The weights used in this subject chamber MVA can be the weights from the chamber model. The scores from the subject chamber is an indication of how closely the chambers and/or the process runs, depending on the embodiment, match.

SIMCA-P+, or another appropriate MVA program, can be used to perform the MVA analysis of the subject chamber. In this regard, SIMCA-P+ provides a graphical user interface that allows identification of which chamber variable contributes to any deviation which may exist.

Figure 1C:
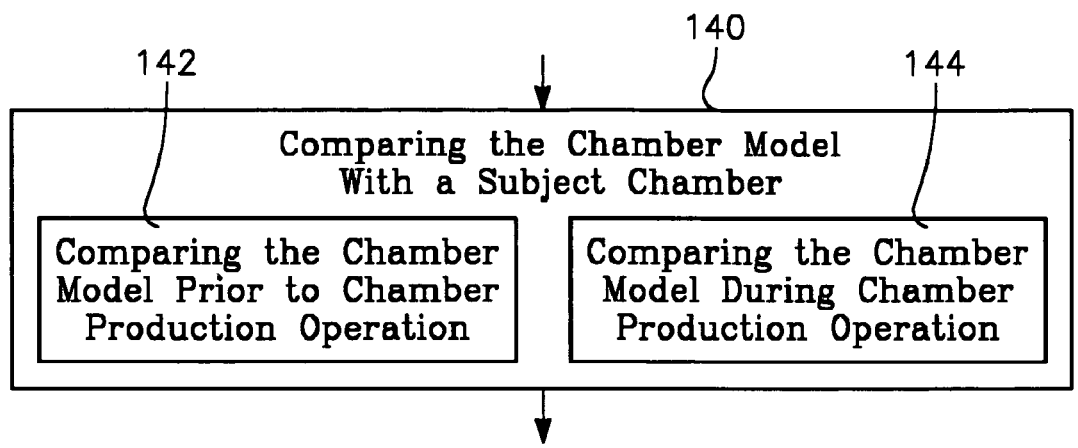
FIG. 1C is a flow chart of a step of a method in accordance with at least one embodiment of the present invention.

As shown in FIG. 1C, the step of comparing the chamber model 140 can include steps of comparing the chamber model prior to chamber operation 142 and comparing the chamber model during chamber operation 144.

Comparing the chamber model prior to chamber operation 142 can be employed for embodiments of the invention where the chamber matching is performed. That is, the step 142 is an offline analysis done when subject chamber is not in operation. Examples of the use of step 142 include comparing the subject chamber to the chamber model to facilitate setting up the subject chamber when its initially manufactured, during startup, when restarting operations after a period of downtime or particular modification, or at any time the overall performance of the chamber is at issue. Often chamber matching is a one time procedure done prior to production operation of the chamber.

With chamber matching embodiments, since the matching is typically done prior to production processing or just after manufacturing of the chamber, immediate feedback is not required (as is the case with fault detection), and the model can be operated in an offline process. In at least some embodiments, the model is operated by a user, who then reviews and compares the chamber matching model to the run to determine if the subject chamber is acceptable or not. This allows the user to make any adjustment(s) needed to the chamber in offline procedure, prior to production operation of the chamber. In other embodiments, the chamber matching model is placed on the tool and the matching is done online.

In contrast, with fault detection for online analysis the results of the comparison are used immediately for issuing warnings and/or faulting the system.

In some embodiments runs from the subject chamber are compared to the chamber model using the same infrastructure typically used for fault detection operations. Use of this infrastructure allows the comparison of the subject chamber to the model in an automated manner. Depending on the embodiment, this automation can allow the chamber to model comparison and the chamber adjustment (as described herein) to be accomplished by the execution a specific program (i.e. by a single mouse click).

Depending on the particular subject chamber, the fault detection infrastructure can include a variety of sensors and indicators used for monitoring the operation of the chamber.

Comparing the chamber model during chamber operation 144 can be employed for embodiments of the invention where chamber fault detection is performed. That is, the step 144 is an online analysis done when subject chamber is in operation. In this manner faults or behavioral deviations in the operation of the chamber can be detected as, or soon after, they occur, allowing the automated system to stop the chamber from processing more wafers.

During step 144 data from the subject chamber during a process run is compared to the chamber model using the chamber monitoring infrastructure. Use of this infrastructure allows the comparison of the subject chamber to the fault detection model in an automated manner. Depending on the embodiment, this automation can allow the comparison (as described herein) to be accomplished by the execution of a program (i.e. by a single mouse click).

For example, with fault detection embodiments, the model can be placed onto (i.e. loaded into) the tool, and then the tool can automatically compare the runs data to the chamber model and provide results. With fault detection having an online model operation, an immediate or faulting can occur to address any problems during processing.

In other embodiments, the fault detection operation can be done offline either manually or in an automated manner. However, performing fault detection offline typically does not allow for adjustment or faulting of the chamber during operation. Performing fault detection offline allows the determination the origin of the yield problem that did not cause the system to fault. This allows further analysis to see if a problem exists that should have been detected and to optimize the model sensitivity by, among other thing by adjust the time of the phase splits.

Figure 4:
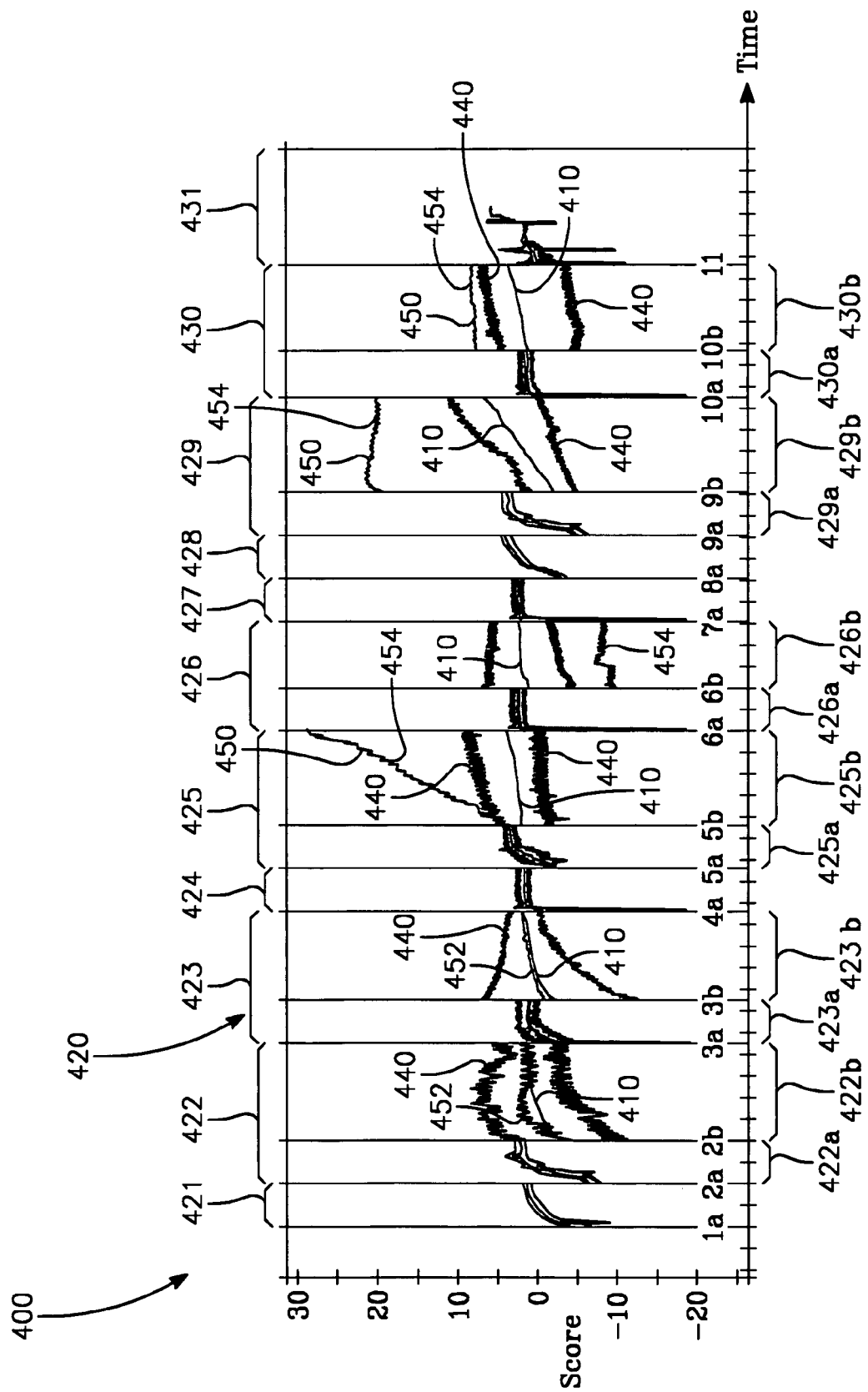
FIG. 4 is a graph of a model in accordance with at least one embodiment of the present invention.

An example of the comparison of score traces for the chamber model and a run of the subject chamber is shown in FIG. 4 (a sample of a run-to-run model being shown). As can be seen, the graph 400 has the chamber model score trace 410 and the statistical variation traces 440 positioned above and below (the traces 440 can set forth standard deviations, such as ±3σ). As such, the traces 440 represent an operation envelope. The time over the process recipe is separated into the phases or steps 420 of the recipe. The phases 420 include a first phase 421, a second phase 422, a third phase 423, a fourth phase 424, a fifth phase 425, a sixth phase 426, a seventh phase 427, an eight phase 428, a ninth phase 429, a tenth phase 430, a eleventh phase 431, and so forth. The phases 420 are further separated into the transition portions and steady-state portions. The second phase 422 includes a transition period 422a and a steady-state portion 422b, the third phase 423 includes a transition period 423a and a steady-state portion 423b, and so forth. Some of the phases are not separated into transition and steady-state portion, which can be due to the relative short duration of the transition of the phase, which may not have a significant influence on the steady-state portion to warrant splitting the phase.

The subject chamber score trace 450 is shown overlaid on the graph 400. As can be seen, in some portions of the phases the subject chamber score 450 generally follows the chamber model trace 410, as shown by sections 452. Sections 452 of the score trace 450 are within the statistical variation traces 440. For the periods of sections 452 the subject chamber is operating within the operational envelope and no problems exist. In other portions of the phases the subject chamber score 450 extends outside of the statistical variation traces 440, as shown by sections 454. The sections 454 indicate that the subject chamber has a problem that may require adjustment or faulting of the chamber.

Variables that contribute to deviations can be determined in any of a variety of applicable known statistical analysis techniques. Statistical analysis techniques such as discriminate analysis and various forms of statistical testing including chi-square tests, t-tests, and the like can be used. To determine the deviation contributing variables each of the weighted variables (as set forth in equation (1) above) can be compared to each other as well as the overall score. In so doing, any weighted variable that is either significantly larger than the other variables and/or contributes a significantly larger portion of the overall score than any weighted variable, is more probably contributing to the deviation. The determination of the variable contributing to the deviation can also be determined by analyzing the probability that the given variable fits with the data of the other variables. The lower the probability, the greater the chance that the variable is contributing to the deviation.

For embodiments which employ the SIMCA-P+ software, variables that contribute to deviations can be determined by the user selecting the region of a score verses time graph which contains the deviation (i.e. a subject chamber score trace positioned outside of the statistical variation traces). SIMCA-P+ will provide a variable contributor plot which shows the contributions of each variable and as such identify which variable(s) is the major contributor, if any. Next the suspect variable(s) can be plotted verses time and compared to the average and statistical variation (e.g. 3σ) from the chamber model. SIMCA-P+ can also calculate an overall distance to model or DmodX quantity that can be used as a figure-of-merit for determining the health of the chamber during the run. The deviations will have higher DmodX values with varying levels of sensitivity to the different deviations.

Figure 1D:
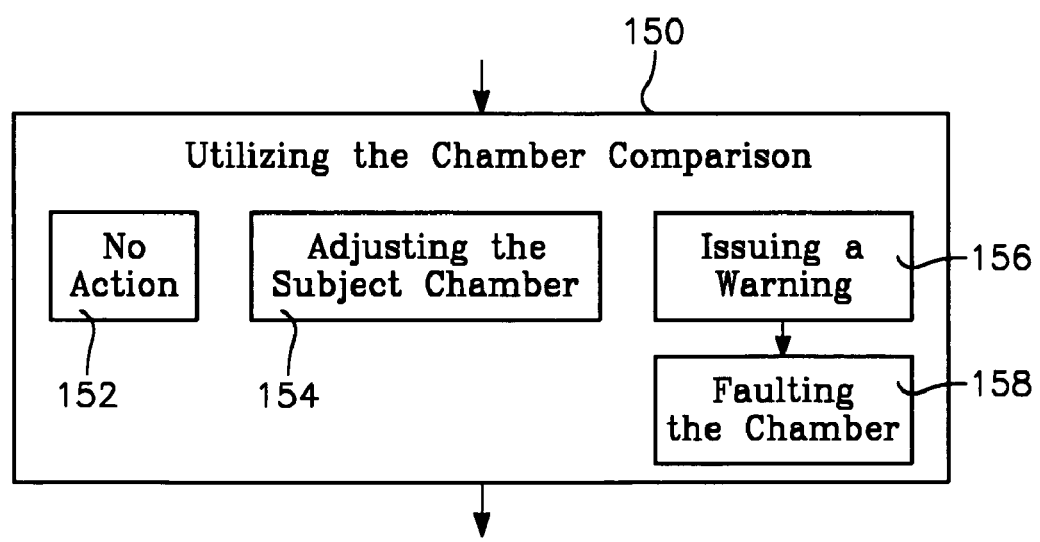
FIG. 1D is a flow chart of a step of a method in accordance with at least one embodiment of the present invention.

Utilizing the Chamber Comparison:

Another step in the method 100 is utilizing the chamber comparison 150. During this step the comparison of the chamber model to the subject chamber obtained in the step 140 is used to determine the next course of action of the method 100. As shown in FIG. 1D, the utilizing step 150 can include the steps of no action 152, adjusting the subject chamber 154, issuing a warning 156, and faulting the chamber 158. Depending on the embodiment, one or more of these sub-steps can be performed.

As the name indicates, during the step of no action 152, no further action is taken. This sub-step is used if as a result of the comparison between the chamber model and the subject chamber it is determine that the subject chamber is sufficiently within the operational limits that the operation of the chamber can continues with the chamber as is. This allows the subject chamber to continue to operate or begin to operate, as the case maybe, without additional adjustment or warning to the operator.

The step of adjusting the subject chamber 154 allows the comparison between the subject chamber and the chamber model to provide guidance for adjustment of the subject chamber. Controls of the subject chamber can be changed to conform the subject chamber to the chamber model. Adjustment of the subject chamber allows the operation of the chamber to be maintained to conform to a known, or good, operation. The chamber adjustment can be done prior to operation of the chamber with a model based on several known chambers, as is the case with chamber matching, or during operation with a model based on prior runs of the subject chamber, as is the case with fault detection.

The step of issuing a warning 156 can occur when the results of the chamber comparison show that the subject chamber is deviating from the chamber model such that is approaching a margin of operation and is tending towards a system fault. Such margins can be any of a variety of limits including the statistical variations of the chamber model, derivations thereof, or some predefined limit. Depending on the embodiment, when a warning is issued it informs the operator of the chamber that the subject chamber is operating at, near to, or is tending toward the fault limit. This allows the operator to monitor the chamber operation and cease operations if so desired. In some embodiments the step of issuing a warning 156 is used prior to, and in conjunction with the step of faulting the system 158, and in other embodiments the step 156 is not employed and instead just step 158 is used. The step 156 can be used with either chamber matching or fault detection, however because it allows for warning to be issued during chamber operation it is typically used with fault detection.

The step of faulting the chamber 158 can be used when the operation of the subject chamber has passed a fault limit. This limit can be determined any of a variety of sources including the statistical variations of the chamber model, derivations thereof, or some predefined value. The result of faulting the chamber can vary depending on the embodiment, with result in some embodiments is ceasing of the operation of the chamber. Ceasing operation can be automated process used in fault detection.

Depending on the operation, a warning can be issued in the step 156 without the proceeding to faulting the chamber in step 158. This can occur for a variety of reasons, including that the operation of the subject chamber does not continue divert from the chamber model such that a fault is issued or the operator could cease operation of the subject chamber prior to reaching the fault limits.

Figure 5:
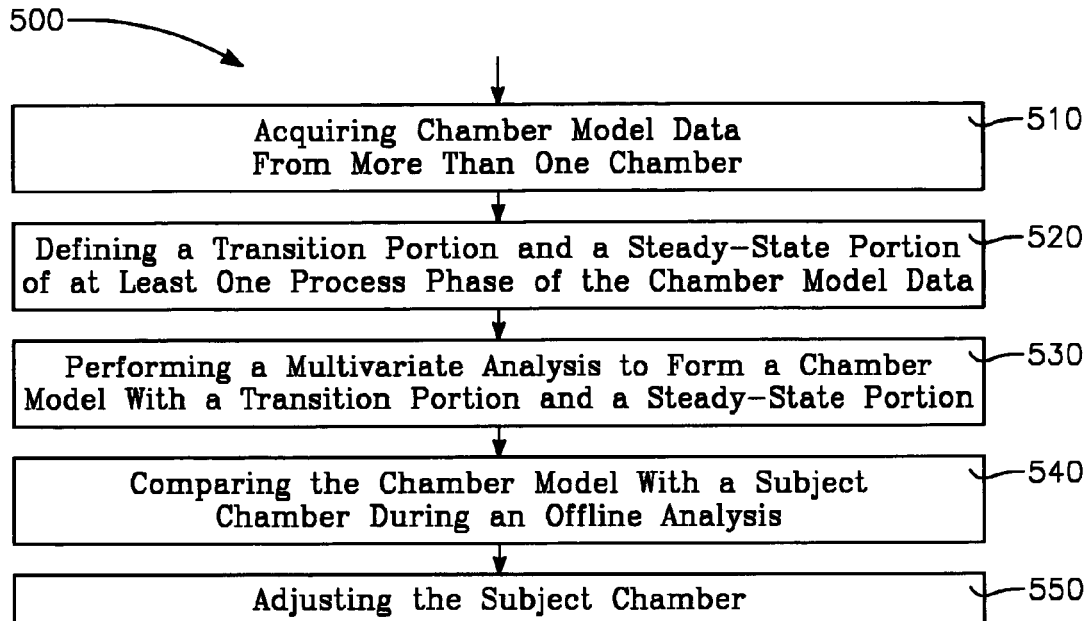
FIG. 5 is a flow chart of a method in accordance with at least one embodiment of the present invention.

In certain embodiments, the present invention is a chamber modeling method for chamber matching 500 which includes acquiring chamber model data from more than one chamber 510, defining a transition portion and a steady-state portion of at least one process phase of the chamber model data 520, performing a multivariate analysis to form a chamber model with a transition portion and a steady-state portion 530, comparing the chamber model with a subject chamber during an offline analysis 540, and adjusting the subject chamber 550. These steps are set forth in FIG. 5.

Figure 6:
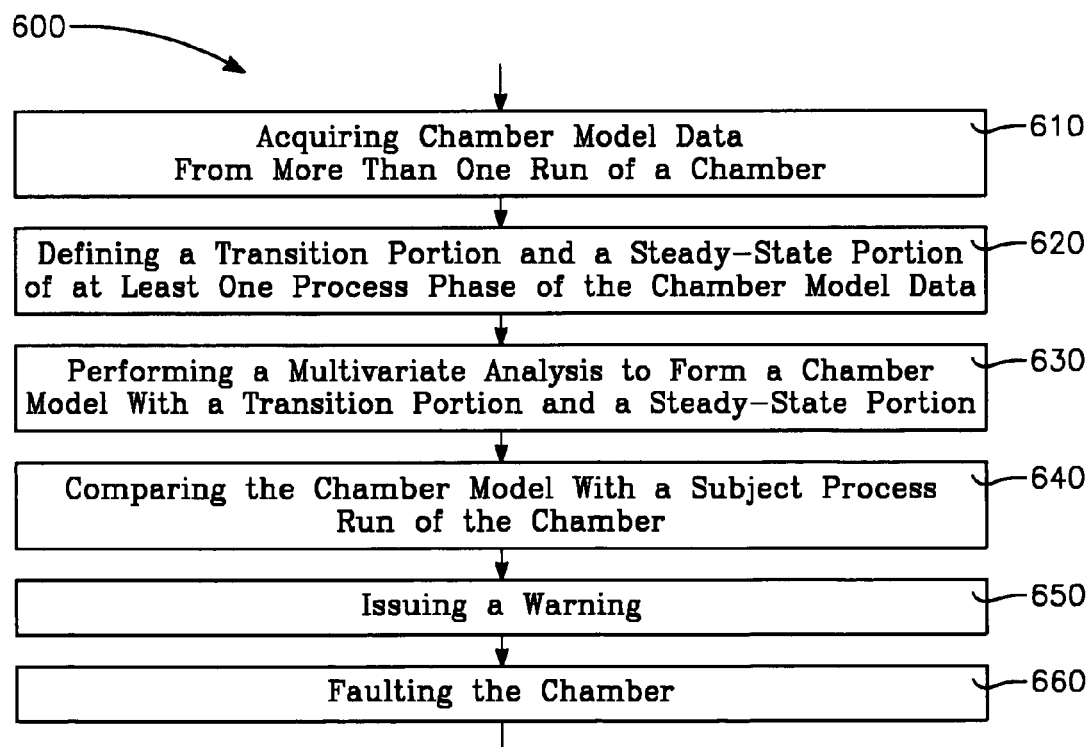
FIG. 6 is a flow chart of a method in accordance with at least one embodiment of the present invention.

In other embodiments, the present invention is a chamber modeling method for fault detection 600 which includes acquiring chamber model data from more than one run of a chamber 610, defining a transition portion and a steady-state portion at least one process phase of the chamber model data 620, performing a multivariate analysis to form a chamber model with a transition portion and a steady-state portion 630, comparing the chamber model with a subject process run of the chamber 640, issuing a warning 650, and faulting the chamber 660. These steps are set forth in FIG. 6. As described in detail herein, the execution of the steps of issuing a warning 650 and faulting the chamber 660 are dependent on the results of the camber comparison. That is, these steps do not have to be executed unless the chamber has reached or passed certain deviation limits (user defined limits).

Figure 7:
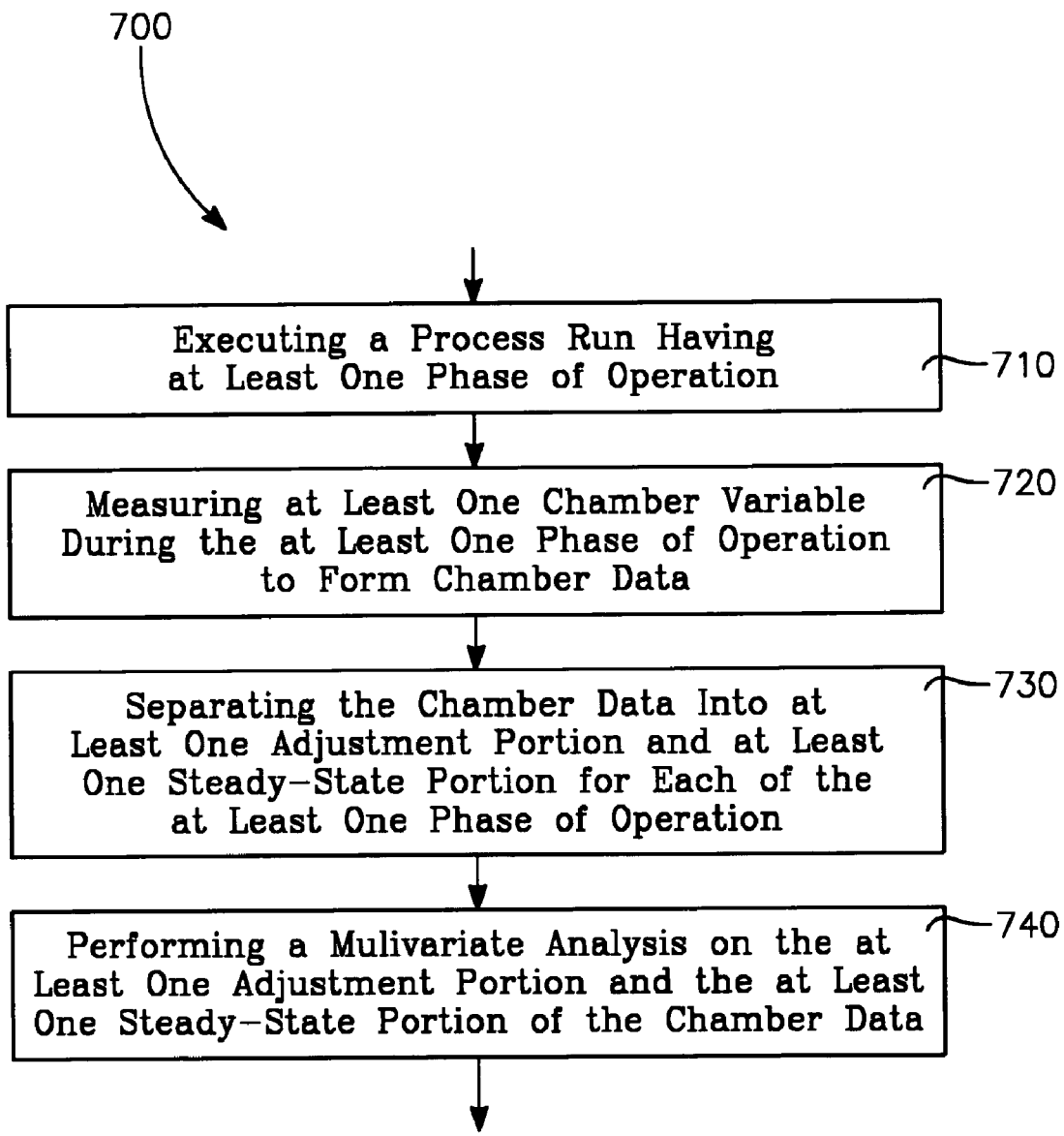
FIG. 7 is a flow chart of a method in accordance with at least one embodiment of the present invention.

Other embodiments of the present invention are set forth in FIG. 7. As shown, the method 700 includes the steps of executing a process run having at least one phase of operation 710, measuring at least one chamber variable during the at least one phase of operation to form chamber data 720, separating the chamber data into at least one adjustment portion and at least one steady-state portion for each of the at least one phase of operation 730, and performing a multivariate analysis on the at least one adjustment portion and the at least one steady-state portion of the chamber data 740.

While embodiments of the present invention have been described in detail above, many changes to these embodiments may be made without departing from the true scope and teachings of the present invention. The present invention, therefore, is limited only as claimed below and the equivalents thereof.

What is claimed is:

1. A method for thin-film process chamber data analysis, the method comprising:
 a) acquiring chamber data;
 b) defining an adjustment portion of the chamber data and a steady-state portion of the chamber data;
 c) forming a chamber model having an adjustment portion and a steady-state portion; and
 d) using the chamber model performing at least one of: 1) providing a user identifiable indication; or 2) performing a chamber adjustment.

2. The method of claim 1, wherein forming a chamber model having a adjustment portion and a steady-state portion comprises performing a multivariate analysis on the adjustment portion and the steady-state portion of the chamber data.

3. The method of claim 1, wherein acquiring chamber model data comprises acquiring chamber model data from more than one chamber.

4. The method of claim 1, wherein acquiring chamber model data comprises acquiring chamber model data from more than one run of a chamber.

5. The method of claim 1, further comprising comparing the chamber model with a subject chamber to provide a chamber data comparison.

6. The method of claim 5, further comprising utilizing the chamber data comparison.

7. The method of claim 6, wherein utilizing the chamber data comparison comprises adjusting the subject chamber.

8. The method of claim 6, wherein utilizing the chamber data comparison comprises at least one of: (1) issuing a warning; or (2) faulting the subject chamber.

9. The method of claim 8, wherein utilizing the chamber data comparison comprises faulting the subject chamber, wherein faulting the subject chamber comprises ceasing operation of the subject chamber.

10. The method of claim 1, wherein defining an adjustment portion of the chamber data and a steady-state portion of the chamber data comprises defining the adjustment portion of the chamber data as comprising chamber data acquired during a transition between at least two operational conditions of a chamber.

11. The method of claim 1, wherein defining an adjustment portion of the chamber data and a steady-state portion of the chamber data comprises defining the steady-state portion of the chamber data as comprising chamber data acquired when a chamber is operating in accordance to at least one predefined operational condition.

12. The method of claim 1, wherein acquiring chamber model data comprises measuring at least one chamber variable over time.

13. The method of claim 12, wherein forming a chamber model having an adjustment portion and a steady-state portion comprises performing a multivariate analysis on the adjustment portion and the steady-state portion of the chamber data, wherein performing a multivariate analysis comprises a forming a linear combination of the at least one chamber variable and individually weighting each of the at least one chamber variable.

14. The method of claim 12, wherein measuring at least one chamber variable over time comprises measuring at least one of: (1) a chamber temperature; (2) a chamber pressure; (3) a gas flow rate; (4) a bias RF power; (5) a source RF power; (6) a microwave power; (7) a voltage reading; (8) a current reading; or (9) a pressure control valve position.

15. The method of claim 12, wherein measuring at least one chamber variable over time comprises measuring at least one of: (1) a pressure; (2) a pressure control valve position; (3) a total gas flow; (4) an individual gas flow; (5) a RF measurement of voltage; (6) a RF measurement of current; (7) a RF measurement of phase; (8) a forward RF power; (9) a reflected RF power; (10) a RF match tuning position; (11) a microwave forward power; (12) microwave reflected power; (13) a microwave tuning position; (14) an electrostatic chuck voltage; (15) an electrostatic chuck current; (16) a helium cooling pressure; (17) a helium cooling flow; (18) a helium cooling leak rate; (19) a magnet current, and (20) a chamber component temperature.

16. The method of claim 5, wherein comparing the chamber model with a subject chamber is performed with the subject chamber offline.

17. The method of claim 5, wherein comparing the chamber model with a subject chamber is performed with the subject chamber online.

18. A split-phase chamber analysis method comprising:
 a) executing a process run having at least one phase of operation;
 b) measuring at least one chamber variable during the at least one phase of operation to form chamber data;
 c) separating the chamber data into at least one adjustment portion and at least one steady-state portion for each of the at least one phase of operation;

e) performing a multivariate analysis on the at least one adjustment portion and the at least one steady-state portion of the chamber data; and f) using results from the multivariate analysis performing at least one of: 1) providing a user identifiable indication; or 2) performing a chamber adjustment.

19. The split-phase chamber analysis method of claim 18, wherein executing a process run comprises executing a process run according to a process recipe comprising the at least one phase of operation, wherein each phase of the least one phase of operation has at least one operational condition defined in the process recipe.

20. The split-phase chamber analysis method of claim 19, wherein the at least one phase of operation comprises at least two phases of operation, and wherein the at least one adjustment portion comprises a transition between operational conditions of separate phases of the at least two phases of operation.

21. The split-phase chamber analysis method of claim 19, wherein the at least one steady-state portion comprises operation of chamber in accordance to at least one operational condition.

22. The split-phase chamber analysis method of claim 18, wherein executing a process run having at least one phase of operation comprises executing a process run having a recipe with a first phase of operation and a second phase of operation, wherein the first phase of operation has a first operational condition defined in the recipe, wherein the second phase of operation has a second process condition defined in the recipe.

23. The split-phase chamber analysis method of claim 22, wherein the at least one adjustment portion comprises a period of transition between the first operational condition and the second operational condition.

24. The split-phase chamber analysis method of claim 22, wherein the at least one steady-state portion comprises a period of operation of chamber in accordance with at least one of: (1) the first operational condition; and (2) the second operational condition.

25. The split-phase chamber analysis method of claim 18, wherein measuring at least one chamber variable comprises measuring at least one chamber variable over time.

26. The split-phase chamber analysis method of claim 25, wherein performing a multivariate analysis on the at least one adjustment portion and the at least one steady-state portion of the chamber data comprises a forming a linear combination of the at least one chamber variable and individually weighting each of the at least one chamber variable.

27. The split-phase chamber analysis method of claim 25, wherein measuring at least one chamber variable over time comprises measuring at least one of: (1) a chamber temperature; (2) a chamber pressure; (3) a gas flow rate; (4) a bias RF power; (5) a source RF power; (6) a microwave power; (7) a voltage reading; (8) a current reading; or (9) a pressure control valve position.

28. The split-phase chamber analysis method of claim 25, wherein measuring at least one chamber variable over time comprises measuring at least one of: (1) a pressure; (2) a pressure control valve position; (3) a total gas flow; (4) an individual gas flow; (5) a RF measurement of voltage; (6) a RF measurement of current; (7) a RF measurement of phase; (8) a forward RF power; (9) a reflected RF power; (10) a RF match tuning position; (11) a microwave forward power; (12) microwave reflected power; (13) a microwave tuning position; (14) an electrostatic chuck voltage; (15) an electrostatic chuck current; (16) a helium cooling pressure; (17) a helium cooling flow; (18) a helium cooling leak rate; (19) a magnet current, and (20) a chamber component temperature.

29. A thin-film chamber analysis method for chamber matching comprising:
a) acquiring chamber model data from more than one known chamber;
b) defining a transition portion and a steady-state portion of at least one process phase of the chamber model data;
c) performing a multivariate analysis to form a chamber model with a transition portion and a steady-state portion;
d) comparing the chamber model with a subject chamber during an offline analysis; and
e) adjusting the subject chamber in response to the comparing of the chamber model with the subject chamber.

30. A thin-film chamber analysis method for fault detection comprising:
a) acquiring chamber model data from more than one run of a chamber;
b) defining a transition portion and a steady-state portion of at least one process phase of the chamber model data;
c) performing a multivariate analysis to form a chamber model with a transition portion and a steady-state portion;
d) comparing the chamber model with a subject process run of the chamber; and
e) providing a user identifiable indication based on results of the comparing the chamber model with the subject process run.

31. The thin-film chamber analysis method for fault detection of claim 30, further comprising issuing a warning.

32. The thin-film chamber analysis method for fault detection of claim 30, further comprising faulting the chamber.

33. The method of claim 1, wherein defining an adjustment portion of the chamber data and a steady-state portion of the chamber data comprises defining the adjustment portion of the chamber data as comprising chamber data acquired during an endpoint transition.

34. The split-phase chamber analysis method of claim 19, wherein the at least one adjustment portion comprises an endpoint transition.

* * * * *

UNITED STATES PATENT AND TRADEMARK OFFICE
CERTIFICATE OF CORRECTION

PATENT NO.       : 7,624,003 B2                                     Page 1 of 1
APPLICATION NO. : 11/033363
DATED            : November 24, 2009
INVENTOR(S)      : John M. Yamartino It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1260 days.

Signed and Sealed this

Twenty-sixth Day of October, 2010

David J. Kappos
*Director of the United States Patent and Trademark Office*